(12) United States Patent
Kuhn

(10) Patent No.: US 8,333,177 B2
(45) Date of Patent: Dec. 18, 2012

(54) MOTOR VEHICLE FUEL SYSTEM HAVING MULTIPLE FUEL TANKS

(75) Inventor: Steven P. Kuhn, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 448 days.

(21) Appl. No.: 12/713,474

(22) Filed: Feb. 26, 2010

(65) Prior Publication Data
US 2011/0209689 A1    Sep. 1, 2011

(51) Int. Cl.
*F02M 37/00* (2006.01)
*B60K 15/03* (2006.01)

(52) U.S. Cl. ............... 123/495; 123/514; 137/255
(58) Field of Classification Search .......... 123/1 A, 123/27 R, 27 GE, 445–447, 454–459, 495–498, 123/506, 510, 514, 525–527, 575–578; 137/255, 137/256

See application file for complete search history.

(56) References Cited

U.S. PATENT DOCUMENTS

| | | | |
|---|---|---|---|
| 4,930,537 A | 6/1990 | Farmer | |
| 5,163,466 A | 11/1992 | Moody | |
| 5,197,443 A | 3/1993 | Hodgkins | |
| 5,551,664 A | 9/1996 | Boke | |
| 5,555,873 A | 9/1996 | Nolen | |
| 5,960,809 A | 10/1999 | Keller | |
| 6,371,157 B1 | 4/2002 | Saylor | |
| 6,382,225 B1 | 5/2002 | Tipton | |
| 6,494,226 B2 | 12/2002 | Tipton et al. | |
| 6,799,562 B2 | 10/2004 | Pratt et al. | |
| 7,055,543 B2 | 6/2006 | Erickson et al. | |
| 7,168,415 B2 | 1/2007 | Studebaker | |
| 7,869,930 B2 * | 1/2011 | Stein et al. | 701/104 |
| 2001/0035215 A1 * | 11/2001 | Tipton et al. | 137/571 |
| 2006/0037587 A1 * | 2/2006 | Mc Clure et al. | 123/509 |
| 2008/0022676 A1 | 1/2008 | Cook | |
| 2010/0024789 A1 * | 2/2010 | Lippa et al. | 123/672 |
| 2010/0030451 A1 * | 2/2010 | Lippa et al. | 701/104 |

* cited by examiner

*Primary Examiner* — John Kwon
*Assistant Examiner* — Johnny Hoang
(74) *Attorney, Agent, or Firm* — Jeffrey P. Calfa; Mark C. Bach

(57) ABSTRACT

A fuel system (10) of an engine (16) has a first fuel tank (12), a second fuel tank (14), and a pump (36) for pumping fuel from the tanks to the engine. A first valve mechanism (32) is selectively operable to a first position that allows fuel to be pumped concurrently from both the first and second tanks to the engine, a second position that allows fuel to be pumped from the first tank, but not the second, and a third position that allows fuel to be pumped from the second tank, but not the first. A second valve mechanism (34) is selectively operable to a first position that allows fuel to return from the engine concurrently to both the first and second tanks, a second position that allows fuel to return to the first tank, but not the second, and a third position that allows fuel to return to the second tank, but not the first.

11 Claims, 9 Drawing Sheets

MOTOR VEHICLE FUEL SYSTEM HAVING MULTIPLE FUEL TANKS

TECHNICAL FIELD

This disclosure relates to motor vehicles that have multiple fuel tanks for holding liquid fuel that is consumed by the vehicles' engines to propel the vehicles.

BACKGROUND OF THE DISCLOSURE

One type of motor vehicle has multiple fuel tanks for holding liquid fuel that is consumed by an engine that propels the vehicle. An example of such a vehicle is a medium or heavy truck that has a right fuel tank on the right side of the truck chassis and a left fuel tank on the left side.

At times during operation of such a vehicle, it may be appropriate to maintain the respective fuel levels in the tanks substantially equal, thereby achieving at least an approximate balance of fuel between the tanks. However at other times during operation of the vehicle, it may be appropriate to reduce the amount of fuel in one tank sufficiently relative to the amount of fuel in the other tank, thereby unbalancing the tanks to some degree.

SUMMARY OF THE DISCLOSURE

A motor vehicle comprises a fuel-consuming engine for propelling the vehicle and a fuel system for fueling the engine.

The fuel system comprises multiple fuel tanks, including at least a first fuel tank and a second fuel tank, each for holding liquid fuel for the engine, at least one pump for pumping fuel from the fuel tanks to the engine, a first valve mechanism through which fuel is delivered from the tanks to the engine and a second valve mechanism through which fuel returns from the engine to the fuel tanks.

The first valve mechanism is selectively operable to at least a first position that allows fuel to be pumped concurrently from both the first fuel tank and the second fuel tank to the engine, a second position that allows fuel to be pumped from the first fuel tank, but not the second fuel tank, to the engine, and a third position that allows fuel to be pumped from the second fuel tank, but not the first fuel tank, to the engine.

The second valve mechanism is selectively operable to at least a first position that allows fuel to return from the engine concurrently to both the first fuel tank and the second fuel tank, a second position that allows fuel to return from the engine to the first fuel tank, but not to the second fuel tank, and a third position that allows fuel to return from the engine to the second fuel tank, but not to the first fuel tank.

Relative levels of liquid fuel in multiple fuel tanks, including at least a first fuel tank and a second fuel tank, of a motor vehicle fuel system that comprises at least one pump for pumping liquid fuel from the fuel tanks to a fuel-consuming engine that propels the vehicle are controlled by selectively operating a first valve mechanism through which fuel is delivered from the tanks to the engine to one of at least a first position that allows fuel to be pumped concurrently from both the first fuel tank and the second fuel tank to the engine, a second position that allows fuel to be pumped from the first fuel tank, but not the second fuel tank, to the engine, and a third position that allows fuel to be pumped from the second fuel tank, but not the first fuel tank, to the engine, and by selectively operating a second valve mechanism through which fuel returns from the engine to the fuel tanks to one of at least a first position that allows fuel to return from the engine concurrently to both the first fuel tank and the second fuel tank, a second position that allows fuel to return from the engine to the first fuel tank, but not to the second fuel tank, and a third position that allows fuel to return from the engine to the second fuel tank, but not to the first fuel tank.

The foregoing summary is accompanied by further detail of the disclosure presented in the following Detailed Description with reference to the following drawings that are part of this disclosure.

DETAILED DESCRIPTION

The disclosure relates to a method and system for selectively drawing fuel from one or more tanks and selectively returning drawn fuel to one or more tanks in order to balance or unbalance fuel levels in the tanks and/or to use return fuel for heating or cooling fuel in the tanks.

Figure 1:
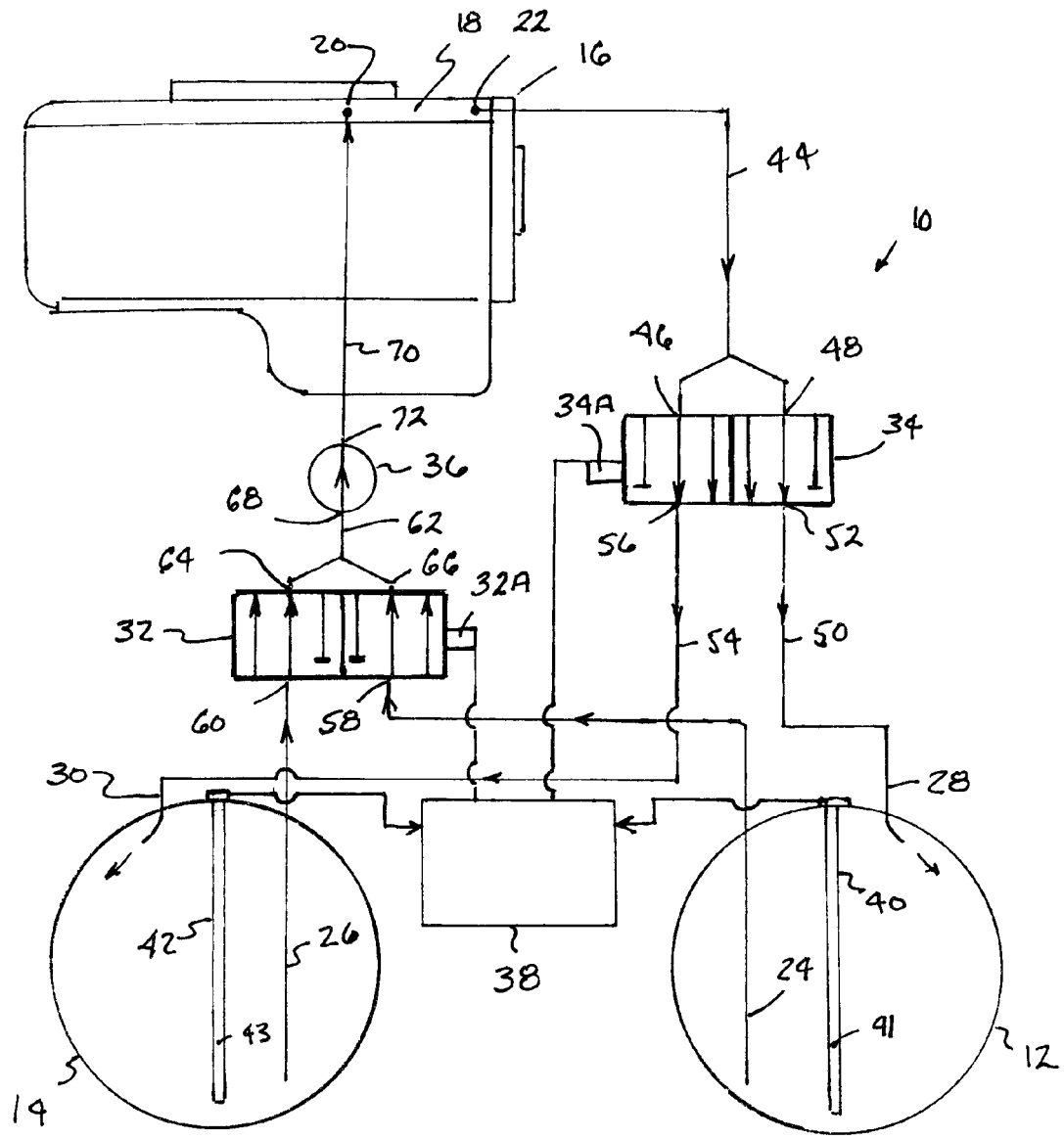
FIG. 1 is a diagram showing a first operating state of a motor vehicle fuel system having multiple fuel tanks.

FIG. 1 shows an example of a motor vehicle fuel system 10 comprising a right fuel tank 12 on the right side of a chassis of the vehicle and a left fuel tank 14 on the left side. Each fuel tank 12, 14 is capable of holding a volume of liquid fuel, and by way of example, may be mounted on a respective side rail of a chassis frame.

An internal combustion engine for propelling the vehicle, such as a diesel engine 16, is supplied with fuel that is stored in tanks 12, 14. The particular engine shown comprises a fuel injection system 18 through a supply port 20 of which fuel is pumped to supply electric-actuated fuel injectors (not shown) through which fuel is injected into combustion chambers of engine 16 at times and in amounts determined by a processor-based engine control system (also not shown). For assuring that ample fuel is always available for the fuel injectors, an excess of fuel is pumped into fuel injection system 18, with the excess leaving through a return port 22 of the fuel injection system.

Fuel can be drawn from each fuel tank through a respective fuel draw conduit 24, 26 and fuel can return to each tank through a respective fuel return conduit 28, 30. How fuel is drawn from and returned to tanks 12, 14 is controlled by a draw valve mechanism 32 and a return valve mechanism 34. The drawing schematically shows each valve mechanism to be a three-position spool valve.

Fuel system 10 comprises at least one pump for drawing fuel from the tanks. A single pump 36 will suffice if located as shown between draw valve mechanism 32 and supply port 20.

Alternately and not shown in the drawings, a respective pump could deliver fuel from each tank to draw valve mechanism 32.

Each valve mechanism 32, 34 can be operated in any suitably appropriate way, such as manually or electrically. In the example shown in the drawing, solenoid actuators 32A, 34A (appearing only in FIG. 1) are associated with the respective valve mechanisms 32, 34 and operated by a controller 38.

A respective fuel level sender 40, 42 provides data representing the level of liquid fuel in the respective tank. While any suitable sender may be used, a typical sender is one that is float-operated to vary an electrical resistance of the sender in correlation with the level of liquid fuel in the tank. Each variable resistance is connected to a data bus of the vehicle's electrical system through which fuel level data for each tank can be provided to controller 38 for operating valve mechanism 32 to one of its positions and valve mechanism 34 to one of its positions based on the data provided by the fuel level senders.

A respective temperature sensor 41, 43 that may be carried by a respective sender 40, 42 can provide data representing the temperature of liquid fuel in the respective fuel tank to controller 38 for operating valve mechanism 32 to one of its positions and valve mechanism 34 to one of its positions based on temperature data provided by the sensors.

Each valve mechanism 32, 34 is selectively operable to one of three states. Because each valve mechanism can be independently operated to each of its three states, nine different combinations of operating states are possible for associating fuel tanks 12 and 14 with engine 16 for delivery and return of fuel.

A conduit 44 places return port 22 in fluid communication with each of two inlet ports 46, 48 of valve mechanism 34. A conduit 50 places an outlet port 52 of valve mechanism 34 in fluid communication with fuel tank 12 through fuel return conduit 28. A conduit 54 places an outlet port 56 of valve mechanism 34 in fluid communication with fuel tank 14 through fuel return conduit 30.

Draw conduit 24 communicates fuel in fuel tank 12 to an inlet port 58 of valve mechanism 32, and draw conduit 26 communicates fuel in fuel tank 14 to an inlet port 60 of valve mechanism 32. A conduit 62 places each of two outlet ports 64, 66 of valve mechanism 32 in fluid communication with a suction port 68 of pump 36, and a conduit 70 communicates an outlet port 72 of pump 36 to supply port 20 of fuel injection system 18.

FIG. 1 shows a first state of fuel system 10 in which valve mechanism 32 has been operated by controller 38 to allow pump 36 to concurrently draw fuel from both fuel tanks 12, 14 and deliver it to fuel injection system 18, while valve mechanism 34 has been operated by controller 38 to allow fuel to return from return port 22 concurrently to both fuel tanks 12, 14. The first state is effective to generally maintain whatever fuel levels exist in the two fuel tanks because the fuel rate draws from the fuel tanks are substantially equal to each other, as are the fuel rate returns. In other words, the fuel level in the first fuel tank and the fuel level in the second fuel tank are maintained within a certain range of each other as the engine operates.

Figure 2:
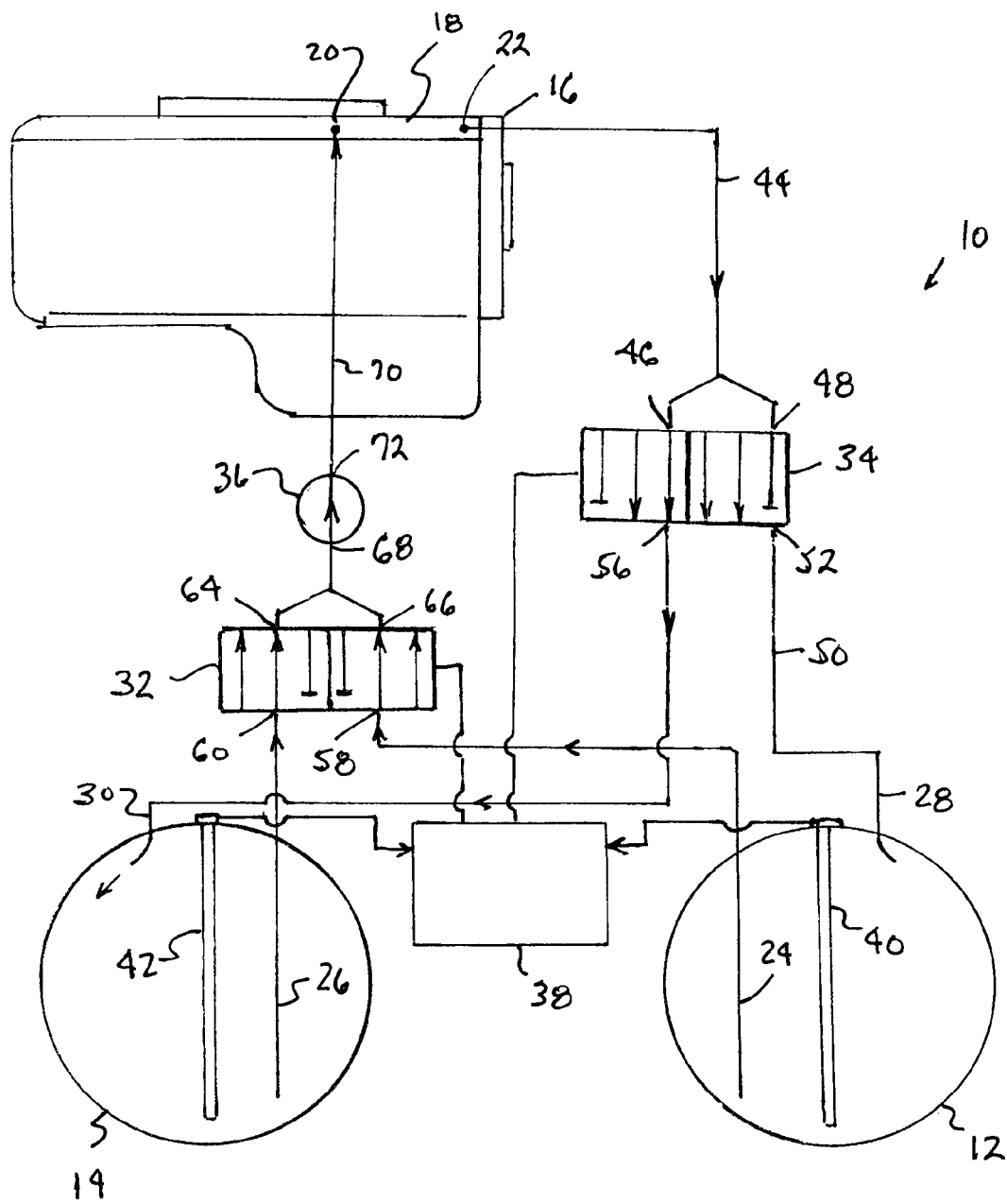
FIG. 2 is another diagram of the fuel system shown in a second operating state.

FIG. 2 shows a second state of fuel system 10 in which valve mechanism 32 still allows fuel to be pumped concurrently from both fuel tanks 12, 14 to engine 16, but valve mechanism 34 has been operated to divert all returning fuel to fuel tank 14. The second state tends toward unbalancing fuel tanks 12, 14 because for substantially equal fuel rate draws from the fuel tanks, fuel tank 12 is deprived of any return fuel, and hence the level of fuel in fuel tank 12 drops more rapidly than that of fuel in fuel tank 14.

Figure 3:
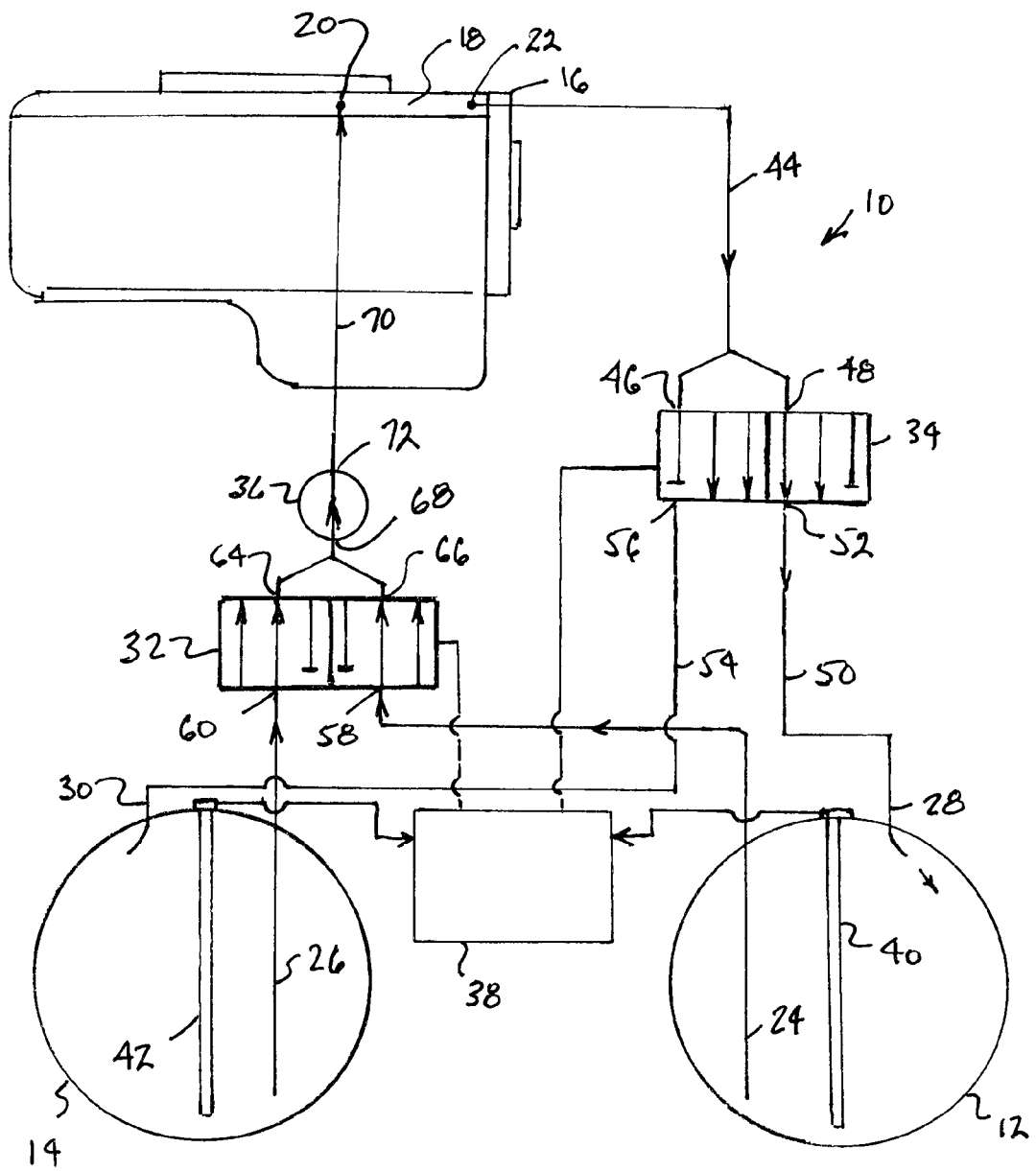
FIG. 3 is another diagram of the fuel system shown in a third operating state.

FIG. 3 shows a third state of fuel system 10 in which valve mechanism 32 still allows fuel to be pumped concurrently from both fuel tanks 12, 14 to engine 16, but valve mechanism 34 has been operated to divert all returning fuel to fuel tank 12. The third state tends toward unbalancing fuel tanks 12, 14 because for substantially equal fuel rate draws from the fuel tanks, fuel tank 14 is deprived of any return fuel, and hence the level of fuel in fuel tank 14 drops more rapidly than that of fuel in fuel tank 12.

Figure 4:
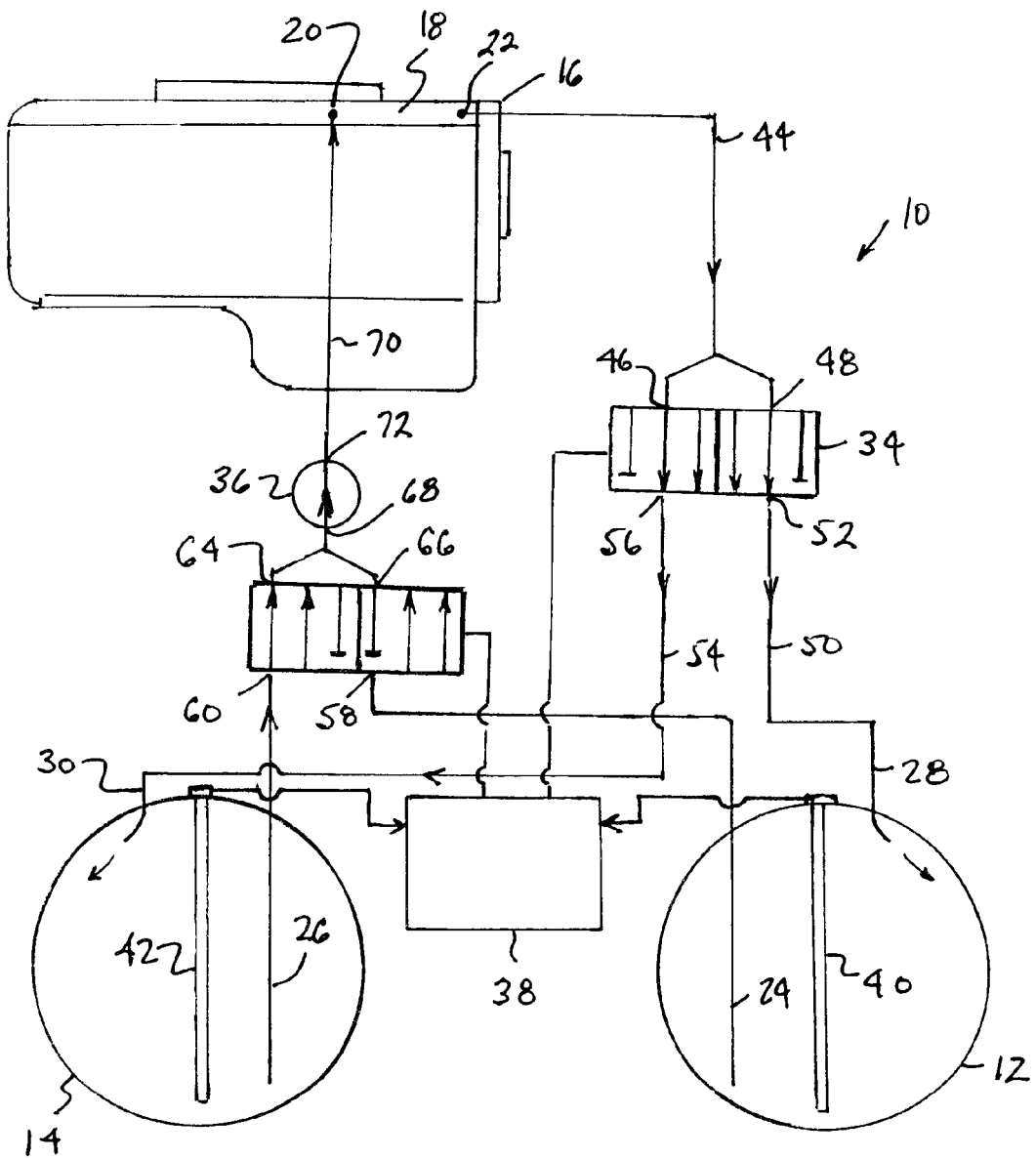
FIG. 4 is another diagram of the fuel system shown in a fourth operating state.

FIG. 4 shows a fourth state of fuel system 10 in which valve mechanism 32 has been operated to allow fuel to be pumped to engine 16 only from tank 14, while valve mechanism 34 has been operated to allow fuel to return from port 22 concurrently to both fuel tanks 12, 14. The fourth state tends toward unbalancing fuel tanks 12, 14 because no fuel is drawn from fuel tank 12, while substantially equal fuel rate returns to the fuel tanks result in the level of fuel in fuel tank 12 rising while the level of fuel in fuel tank 14 is dropping.

Figure 5:
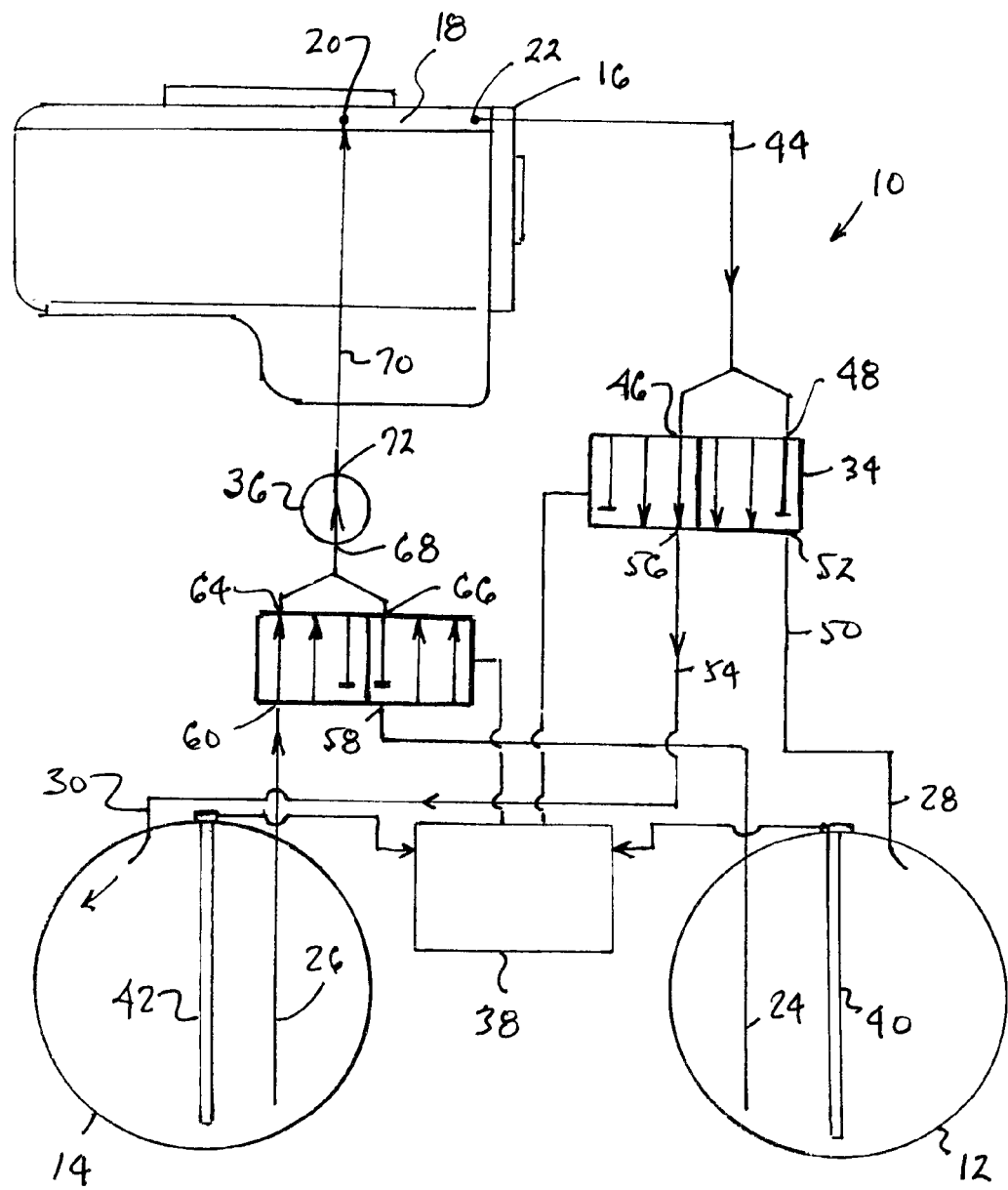
FIG. 5 is another diagram of the fuel system shown in a fifth operating state.

FIG. 5 shows a fifth state of fuel system 10 in which valve mechanism 32 still allows fuel to be pumped to engine 16 only from fuel tank 14, but valve mechanism 34 has been operated to divert all returning fuel to tank 14. The fifth state tends toward unbalancing fuel tanks 12, 14 because fuel tank 12 is in effect removed from fuel system 10 so that its fuel level remains unchanged while the level of fuel in fuel tank 14 is dropping.

Figure 6:
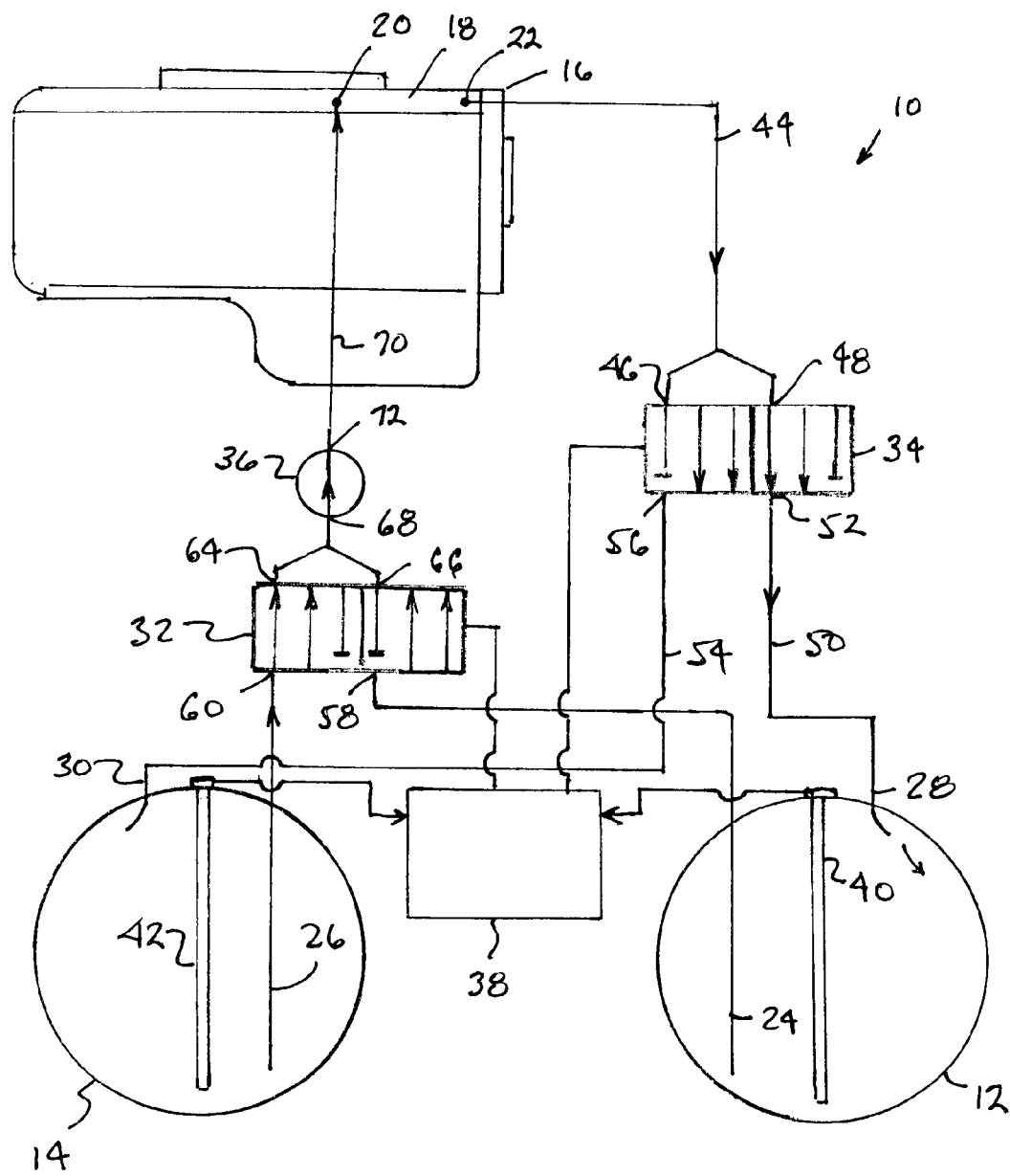
FIG. 6 is another diagram of the fuel system shown in a sixth operating state.

FIG. 6 shows a sixth state of fuel system 10 in which valve mechanism 32 still allows fuel to be pumped to engine 16 only from fuel tank 14 but valve mechanism 34 has been operated to divert all returning fuel to tank 12. The sixth state tends toward unbalancing fuel tanks 12, 14 because the level of fuel in fuel tank 12 is rising while the level of fuel in fuel tank 14 is dropping.

Figure 7:
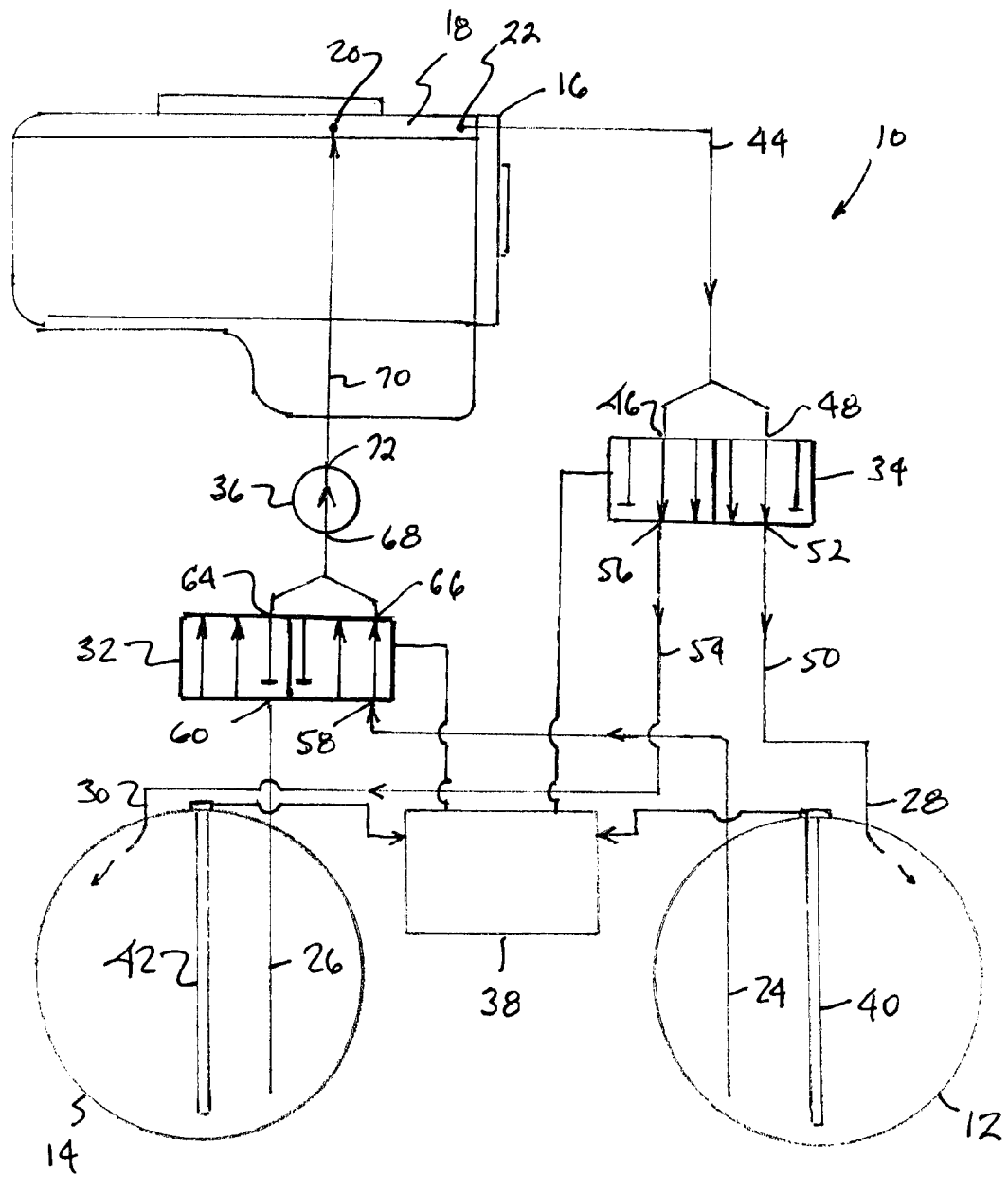
FIG. 7 is another diagram of the fuel system shown in a seventh operating state.

FIG. 7 shows a seventh state of fuel system 10 in which valve mechanism 32 has been operated to allow fuel to be pumped to engine 16 only from fuel tank 12 while valve mechanism 34 has been operated to allow fuel to return from port 22 concurrently to both fuel tanks 12, 14. The seventh state tends toward unbalancing fuel tanks 12, 14 because no fuel is drawn from fuel tank 14, while substantially equal fuel rate returns to the fuel tanks result in the level of fuel in fuel tank 14 rising while the level of fuel in fuel tank 12 is dropping.

Figure 8:
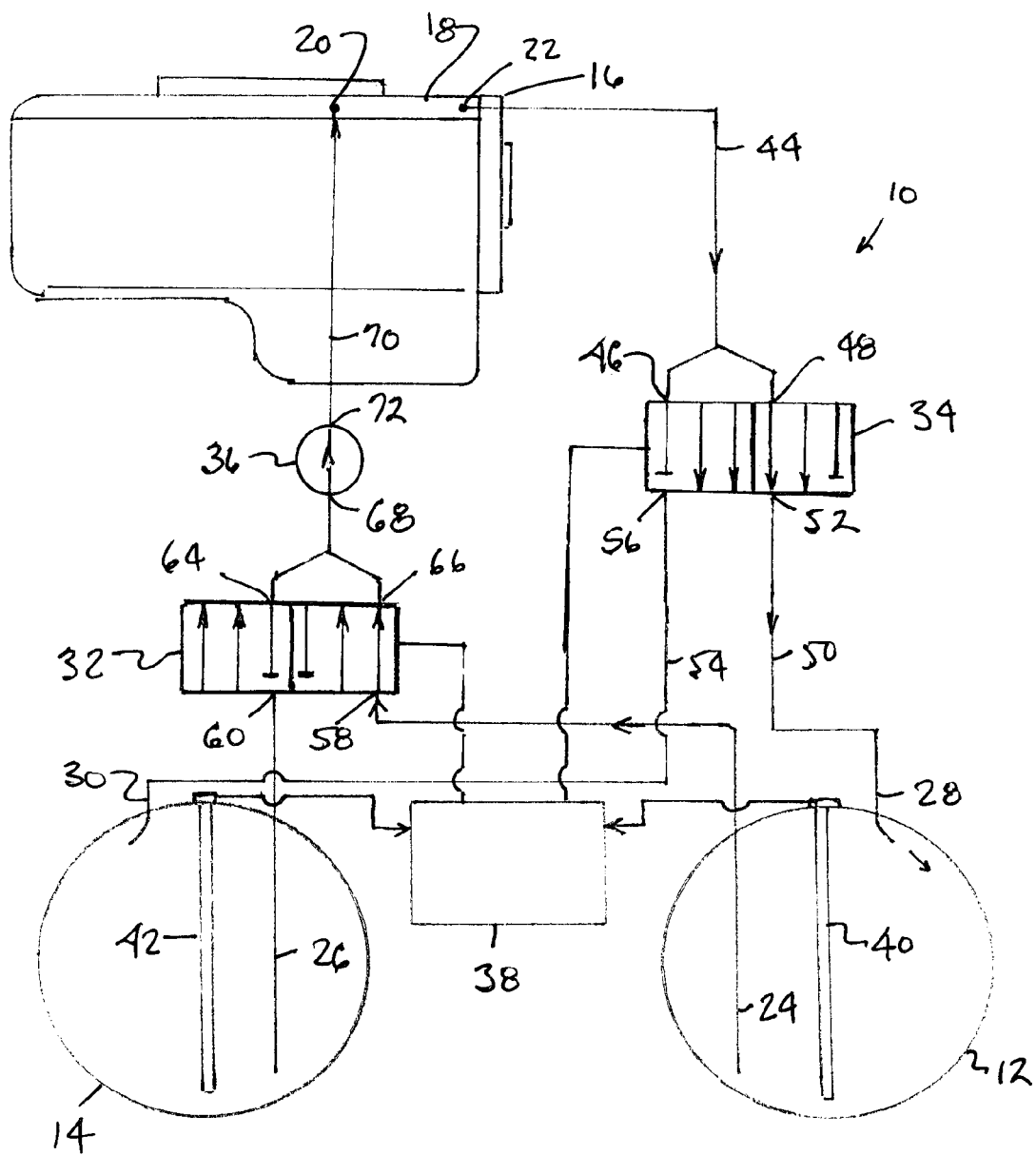
FIG. 8 is another diagram of the fuel system shown in an eighth operating state.

FIG. 8 shows an eighth state of fuel system 10 in which valve mechanism 32 still allows fuel to be pumped to engine 16 only from fuel tank 12, but valve mechanism 34 has been operated to divert all returning fuel to fuel tank 12. The eighth state tends toward unbalancing fuel tanks 12, 14 because fuel tank 14 is in effect removed from fuel system 10 so that its fuel level remains unchanged while the level of fuel in fuel tank 12 is dropping.

Figure 9:
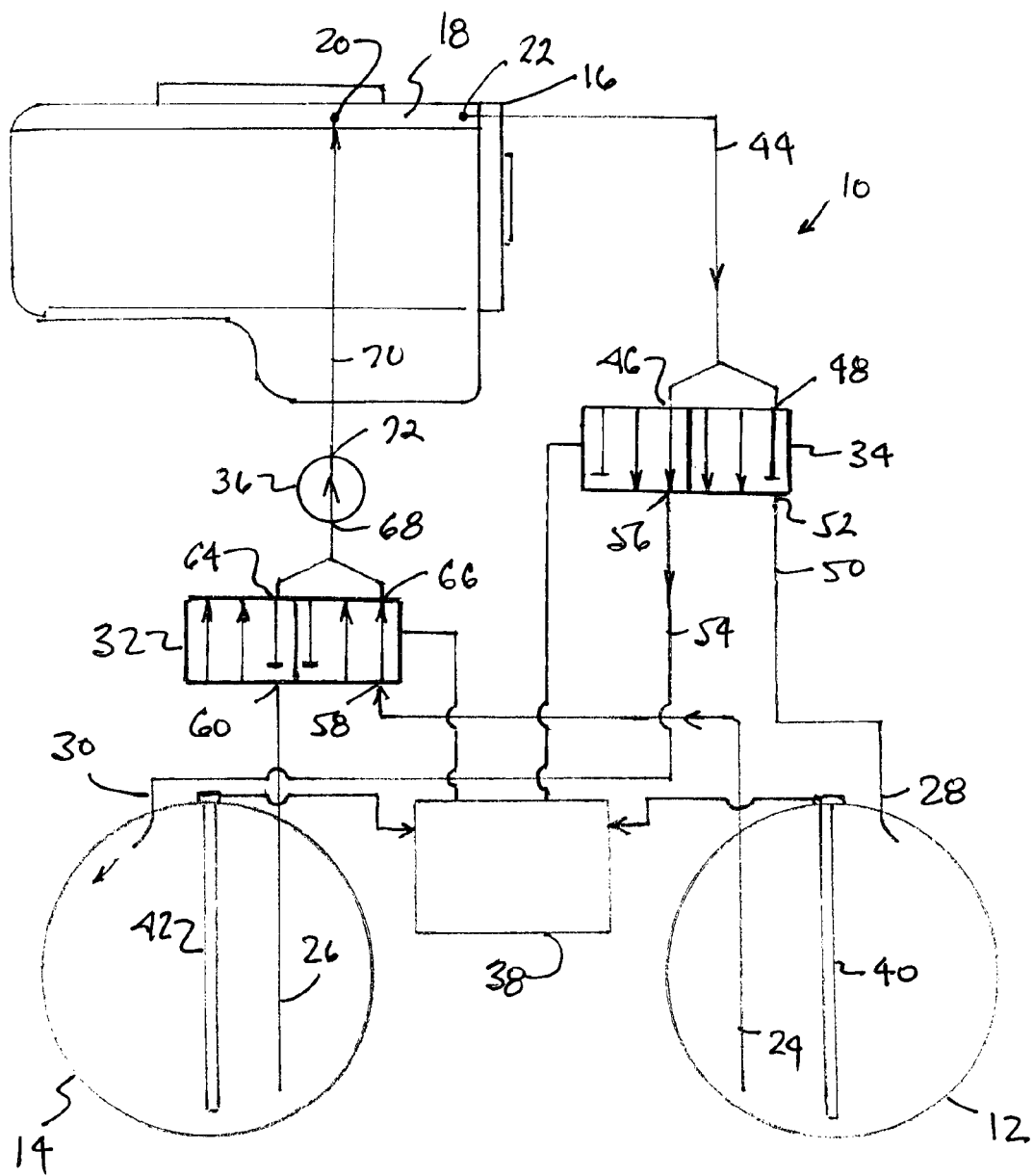
FIG. 9 is another diagram of the fuel system shown in a ninth operating state.

FIG. 9 shows a ninth state of fuel system 10 in which valve mechanism 32 still allows fuel to be pumped to engine 16 only from fuel tank 12, but valve mechanism 34 has been operated to divert all returning fuel to tank 14. The ninth state tends toward unbalancing fuel tanks 12, 14 because the level of fuel in fuel tank 14 is rising while the level of fuel in fuel tank 12 is dropping.

Maintenance of reasonable balance of fuel between side-mounted fuel tanks of a vehicle avoids running one tank dry as long as the total amount of fuel on-board is above some minimum. If an unacceptable amount of unbalance is indicated by fuel level senders 40, 42, controller 38 can operate valve mechanisms 32, 34 to an appropriate fuel system state to correct the unbalance. This is accomplished without a separate transfer pump.

Controller 38 may operate valve mechanisms 32, 34 to an appropriate fuel system state that tends to deliberately unbalance the fuel levels rather than to restore fuel level balance when an unacceptable amount of unbalance has been indicated. An example of this would be when it is intended to heat fuel in a particular one of two tanks.

The foregoing has disclosed a motor vehicle comprising a fuel-consuming engine 16 for propelling the vehicle, and a fuel system 10 for fueling engine 16. The fuel system comprises at least a first fuel tank 12 and a second fuel tank 14, each for holding liquid fuel for engine, at least one pump 36 for pumping fuel from fuel tanks 12, 14 to engine 16, a first valve mechanism 32 through which fuel is delivered from fuel tanks 12, 14 to engine 16 and which is selectively operable to at least a first position that allows fuel to be pumped concurrently from both first fuel tank 12 and second fuel tank 14 to engine 16, a second position that allows fuel to be pumped from first fuel tank 12, but not second fuel tank 14, to engine 16, and a third position that allows fuel to be pumped from second fuel tank 14, but not first fuel tank 12, to engine 16, and a second valve mechanism 34 through which fuel returns from engine 16 to fuel tanks 12, 14 and which is selectively operable to at least a first position that allows fuel to return from engine 16 concurrently to both first fuel tank 12 and second fuel tank 14, a second position that allows fuel to return from engine 16 to first fuel tank 12, but not to second fuel tank 14, and a third position that allows fuel to return from engine 16 to second fuel tank 14, but not to first fuel tank 12.

The foregoing has further disclosed that first fuel tank 12 comprises a first fuel level sender 40 for providing data representing level of liquid fuel in first fuel tank 12, second fuel tank 14 comprises a second fuel level sender 42 for providing data representing level of liquid fuel in second fuel tank 14, and that a controller 38 operates first valve mechanism 32 to one of its positions and second valve mechanism 34 to one of its positions based on the data provided by first fuel level sender 40 and the data provided by second fuel level sender 42.

Controller 38 may operate first valve mechanism 32 and second valve mechanism 34 to respective positions that maintain the level of liquid fuel in first fuel tank 12 and the level of liquid fuel in second fuel tank 14 within a certain range of each other as engine 16 operates. A first sensor 41 may provide data representing temperature of liquid fuel in first fuel tank 12, and a second sensor 43 may provide data representing temperature of liquid fuel in second fuel tank 14. Controller 38 may operate first valve mechanism 32 to one of its positions and second valve mechanism 34 to one of its positions based on the data provided by the first sensor and the data provided by the second sensor. First valve mechanism 32 may comprise a three-position spool valve and second valve mechanism 34 may comprise a three-position spool valve.

The foregoing has also disclosed a method for controlling relative levels of liquid fuel in first fuel tank 12 and second fuel tank 14 by selectively operating first valve mechanism 32 to one of at least the first position that allows fuel to be pumped concurrently from both first fuel tank 12 and second fuel tank 14 to engine 16, a second position that allows fuel to be pumped from first fuel tank 12, but not second fuel tank 14, to engine 16, and a third position that allows fuel to be pumped from second fuel tank 14, but not first fuel tank 12, to engine 16, and selectively operating second valve mechanism 34 to one of at least a first position that allows fuel to return from engine 16 concurrently to both first fuel tank 12 and second fuel tank 14, a second position that allows fuel to return from engine 16 to first fuel tank 12, but not to second fuel tank 14, and a third position that allows fuel to return from engine 16 to second fuel tank 14, but not first fuel tank 12.

Operation of first valve mechanism 32 to one of its positions and second valve mechanism 34 to one of its positions is based on data representing level of liquid fuel in first fuel tank 12 provided by a first fuel level sender 40 and data representing level of liquid fuel in second fuel tank 14 provided by a second fuel level sender 42. The respective data may be processed in a controller to cause first valve mechanism 32 to operate to one of its positions and second valve mechanism 34 to operate to one of its positions based on a result of the processing. The result may operate first valve mechanism 32 and second valve mechanism 34 to respective positions that maintain the level of liquid fuel in first fuel tank 12 and the level of liquid fuel in second fuel tank 14 within a certain range of each other as engine 16 operates. First valve mechanism 32 may be operated to one of its positions and second valve mechanism 34 may be operated to one of its positions based on data representing temperature of liquid fuel in first fuel tank 12 and data representing temperature of liquid fuel in second fuel tank 14.

What is claimed is:

1. A motor vehicle comprising:
   a fuel-consuming engine for propelling the vehicle;
   and a fuel system for fueling the engine;
   wherein the fuel system comprises a first fuel tank and a second fuel tank, each for holding liquid fuel for the engine, a pump for pumping fuel from the first and second fuel tanks to the engine, a first valve through which the pump can draw fuel from the first and second fuel tanks and pump the drawn fuel to the engine and which comprises a mechanism which is selectively operable to a first fuel-draw position that allows the pump to draw fuel concurrently from both the first fuel tank and the second fuel tank and pump fuel drawn from both the first fuel tank and the second fuel tank to the engine, a second fuel-draw position that allows the pump to draw fuel from the first fuel tank, but not from the second fuel tank, and pump fuel drawn from only the first fuel tank to the engine, and a third fuel-draw position that allows the pump to draw fuel from the second fuel tank, but not from the first fuel tank, and pump fuel drawn from only the second fuel tank to the engine, and a second valve through which fuel returns from the engine to the first and second fuel tanks and which comprises a mechanism which is selectively operable to a first fuel-return position that allows fuel to return from the engine concurrently to both the first fuel tank and the second fuel tank, a second fuel-return position that allows fuel to return from the engine to the first fuel tank, but not to the second fuel tank, and a third fuel-return position that allows fuel to return from the engine to the second fuel tank, but not to the first fuel tank; and
   a first actuator for selectively operating the mechanism of the first valve to its respective fuel-draw positions and a second actuator for selectively operating the mechanism of the second valve to its respective fuel-return positions, each actuator being operable independently of the other.

2. A motor vehicle as set forth in claim 1 in which the first fuel tank comprises a first fuel level sender for providing data representing level of liquid fuel in the first fuel tank, the second fuel tank comprises a second fuel level sender for providing data representing level of liquid fuel in the second fuel tank, and in which a controller operates the mechanism of the first valve to one of its respective fuel-draw positions via the first actuator and the mechanism of the second valve to one of its respective fuel-return positions via the second actuator based on the data provided by the first fuel level sender and the data provided by the second fuel level sender.

3. A motor vehicle as set forth in claim 2 in which the controller is effective to operate the mechanism of the first valve via the first actuator and the mechanism of the second valve via the second actuator to respective fuel-draw and fuel-return positions that maintain the level of liquid fuel in the first fuel tank and the level of liquid fuel in the second fuel tank within a certain range of each other as the engine operates.

4. A motor vehicle as set forth in claim 2 comprising a first sensor for providing data representing temperature of liquid fuel in the first fuel tank, a second sensor for providing data representing temperature of liquid fuel in the second fuel tank, and in which the controller operates the mechanism of the first valve via the first actuator to one of its respective fuel-draw positions and the mechanism of the second valve via the second actuator to one of its respective fuel-return positions based on the data provided by the first sensor and the data provided by the second sensor.

5. A motor vehicle as set forth in claim 1 in which the first valve comprises a first three-position spool valve and the second valve comprises a second three-position spool valve.

6. A motor vehicle as set forth in claim 5 in which the first actuator comprises a first solenoid actuator and the second actuator comprises a second solenoid actuator.

7. A method for controlling relative levels of liquid fuel in a first fuel tank and a second fuel tank of a motor vehicle fuel system that comprises a pump for pumping liquid fuel from the first and second fuel tanks to a fuel-consuming engine that propels the motor vehicle, the method comprising:

selectively operating a mechanism of a first valve through which the pump can draw fuel from the first and second fuel tanks to one of a first fuel-draw position that allows the pump to draw fuel concurrently from both the first fuel tank and the second fuel tank and pump fuel drawn through the first valve from both the first fuel tank and the second fuel tank to the engine, a second fuel-draw position that allows the pump to pump fuel from the first fuel tank, but not from the second fuel tank, and pump fuel drawn through the first valve from only the first fuel tank to the engine, and a third fuel-draw position that allows the pump to draw fuel from the second fuel tank, but not from the first fuel tank, and pump fuel drawn from only the second fuel tank to the engine, and selectively operating a mechanism of a second valve through which fuel can return from the engine to the first and second fuel tanks to one of a first fuel-return position that allows fuel to return from the engine concurrently to both the first fuel tank and the second fuel tank, a second fuel-return position that allows fuel to return from the engine to the first fuel tank, but not to the second fuel tank, and a third fuel-return position that allows fuel to return from the engine to the second fuel tank, but not to the first fuel tank;

operating the mechanism of the first valve to a selected one of its respective fuel-draw positions via a first actuator; and operating the mechanism of the second valve to a selected one of its respective fuel-return positions via a second actuator;

wherein the steps of operating the mechanism of the first valve and of operating the mechanism of the second valve are performed independently of each other.

8. A method as set forth in claim 7 comprising operating the mechanism of the first valve to one of its respective fuel-draw positions and the mechanism of the second valve to one of its respective fuel-return positions based on data representing level of liquid fuel in the first fuel tank provided by a first fuel level sender and data representing level of liquid fuel in the second fuel tank provided by a second fuel level sender.

9. A method as set forth in claim 8 in which the steps of operating the mechanism of the first valve to one of its respective fuel-draw positions and the mechanism of the second valve to one of its respective fuel-return positions based on data representing level of liquid fuel in the first fuel tank and data representing level of liquid fuel in the second fuel tank comprises processing the respective data in a controller and causing the first actuator to operate the mechanism of the first valve to one of its respective fuel-draw positions and causing the second actuator to operate the mechanism of the second valve to operate to one of its respective fuel-return positions based on a result of the processing.

10. A method as set forth in claim 9 in which the processing is performed to obtain a result that causes the first actuator to operate the mechanism of the first valve to a selected one of its fuel-draw positions and the second actuator to operate the mechanism of the second valve to a selected one of its fuel-return positions that maintain the level of liquid fuel in the first fuel tank and the level of liquid fuel in the second fuel tank within a certain range of each other as the engine operates.

11. A method as set forth in claim 7 further comprising operating the mechanism of the first valve to one of its respective fuel-draw positions and the mechanism of the second valve to one of its respective fuel-return positions based on data representing temperature of liquid fuel in the first fuel tank and data representing temperature of liquid fuel in the second fuel tank.

* * * * *